US008694981B2

(12) United States Patent
Federighi et al.

(10) Patent No.: US 8,694,981 B2
(45) Date of Patent: Apr. 8, 2014

(54) SHARED RESOURCE DEPENDENCIES

(75) Inventors: Craig M. Federighi, Los Altos Hills, CA (US); Jack R. Matthew, San Francisco, CA (US); Randy D. Saldinger, San Jose, CA (US); Steven C. Cento, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 442 days.

(21) Appl. No.: 12/948,721

(22) Filed: Nov. 17, 2010

(65) Prior Publication Data

US 2012/0124566 A1 May 17, 2012

(51) Int. Cl.
*G06F 9/45* (2006.01)

(52) U.S. Cl.
USPC .......................................................... 717/164

(58) Field of Classification Search
USPC .......................................................... 717/164
See application file for complete search history.

(56) References Cited

U.S. PATENT DOCUMENTS

| 5,613,101 | A | 3/1997 | Lillich |
| 6,323,846 | B1 | 11/2001 | Westerman et al. |
| 6,493,871 | B1 | 12/2002 | McGuire et al. |
| 6,570,557 | B1 | 5/2003 | Westerman et al. |
| 6,677,932 | B1 | 1/2004 | Westerman |
| 7,418,700 | B2 | 8/2008 | Zimniewicz et al. |
| 2002/0015024 | A1 | 2/2002 | Westerman et al. |
| 2002/0049857 | A1* | 4/2002 | Farber et al. ................. 709/245 |
| 2006/0020810 | A1 | 1/2006 | Waltermann et al. |
| 2007/0006222 | A1 | 1/2007 | Maier et al. |
| 2007/0234349 | A1 | 10/2007 | Ushiku |
| 2009/0037585 | A1* | 2/2009 | Miloushev et al. ........... 709/226 |
| 2009/0310776 | A1 | 12/2009 | Kanemitsu |
| 2010/0162229 | A1 | 6/2010 | Tsuk et al. |
| 2011/0072421 | A1* | 3/2011 | Parry et al. .................... 717/168 |

OTHER PUBLICATIONS

PCT Notification of Transmittal of the International Search Report and Written Opinion of the International Searching Authority, or the Declaration, for the PCT Int'l. Appln. No. US2011/060777, mailed Feb. 6, 2012, (9 pages).
International Preliminary Report on Patentability (Chapter 1), mailing date May 30, 2013, for corresponding International Application No. PCT/US2011/060777, 6 pages.

* cited by examiner

*Primary Examiner* — John Chavis
(74) *Attorney, Agent, or Firm* — Blakely, Sokoloff, Taylor & Zafman LLP

(57) ABSTRACT

Described herein are methods for sharing resource dependencies between applications stored on a system. For example, in at least certain embodiments, a computer-implemented method for sharing resource dependencies includes installing or initiating installation of multiple application bundles having one or more applications and respective resources on the system. Next, an installer determines identifiers (e.g., hash signatures) for first and second resources and determines whether the resources are identical if an identifier for the first resource matches an identifier for the second resource. Then, a link is created from the second application bundle to the first resource of the first application bundle if the first resource is identical to the second resource. The second resource may be removed from the system if it has been installed. Alternatively, installation of the second resource is terminated if it has not been installed on the system.

25 Claims, 7 Drawing Sheets

SHARED RESOURCE DEPENDENCIES

TECHNICAL FIELD

Embodiments of the present invention relate to methods for sharing resource dependencies within a system.

BACKGROUND

Various devices such as electronic devices, computing systems, portable devices, and handheld devices have applications suites with various software applications that share resources (e.g., a framework of supporting libraries). A software framework is an abstraction in which common code providing generic functionality can be selectively overwritten or specialized by user code providing specific functionality. Frameworks are a special case of software libraries in that they are reusable codes wrapped in a well-defined application programming interface (API). A framework distinguishes from a library or normal user application in that the overall program's flow of control is not dictated by the caller, but by the framework. Software applications that share a framework will have the same look and feel based on sharing the same framework.

If an entire application suite is purchased and installed together, then space in non-volatile storage of a system is saved by linking all of the applications in the suite to the same framework. However, if the applications are purchased and installed separately, then multiple copies of an identical framework may be installed. The multiple copies of the identical framework are loaded into volatile memory when the corresponding applications are executed. The multiple copies of the identical framework require additional storage space in the non-volatile storage and the volatile memory.

SUMMARY

Described herein are methods for sharing resource dependencies between applications stored on a system. For example, in at least certain embodiments, a computer-implemented method for sharing resource dependencies includes installing multiple application bundles each having one or more applications and resources (e.g., frameworks, directory of files) on the system. Next, an installer determines identifiers (e.g., hash signatures) for first and second resources and determines whether the resources are identical if an identifier for the first resource matches an identifier for the second resource. The second resource can be removed from the system and a link is created from the second application bundle to the first resource if the first resource is identical to the second resource.

In an embodiment, a computer-implemented method for sharing resource dependencies includes initiating installation of one or more application(s) and respective resource(s) on the system. For example, a first application and a first resource may be installed on the system. An identifier for the first resource may be stored on the system. Next, an installer determines an identifier (e.g., hash signatures) for a second resource that may be installed and compares this identifier to the identifier for the previously installed first resource. Then, if the identifiers match, the installer determines whether the resources are identical. A link is created from the second resource to a link of the first resource if the first resource is identical to the second resource. The installation of the second resource, which has been initiated, is then terminated.

The present disclosure includes systems and devices that perform these methods, including data processing systems which perform these methods, and machine readable media which when executed on data processing systems cause the systems to perform these methods.

BRIEF DESCRIPTION OF THE DRAWINGS

The present invention is illustrated by way of example, and not by way of limitation, in the figures of the accompanying drawings and in which.

DETAILED DESCRIPTION

Described herein are methods for sharing resource dependencies between applications stored on a system. For example, in at least certain embodiments, a computer-implemented method for sharing resource dependencies includes installing or initiating installation of multiple application bundles that include one or more applications, respective resources, embedded code, and other resources on the system. Next, an installer determines identifiers (e.g., hash signatures) for first and second resources and determines whether the resources are identical if an identifier for the first resource matches an identifier for the second resource. Then, a link is created from the second application bundle to the first resource if the first resource is identical to the second resource. The second resource can be removed from the system if it has been installed. Alternatively, installation of the second resource is terminated if it has not been installed on the system.

Figure 1:
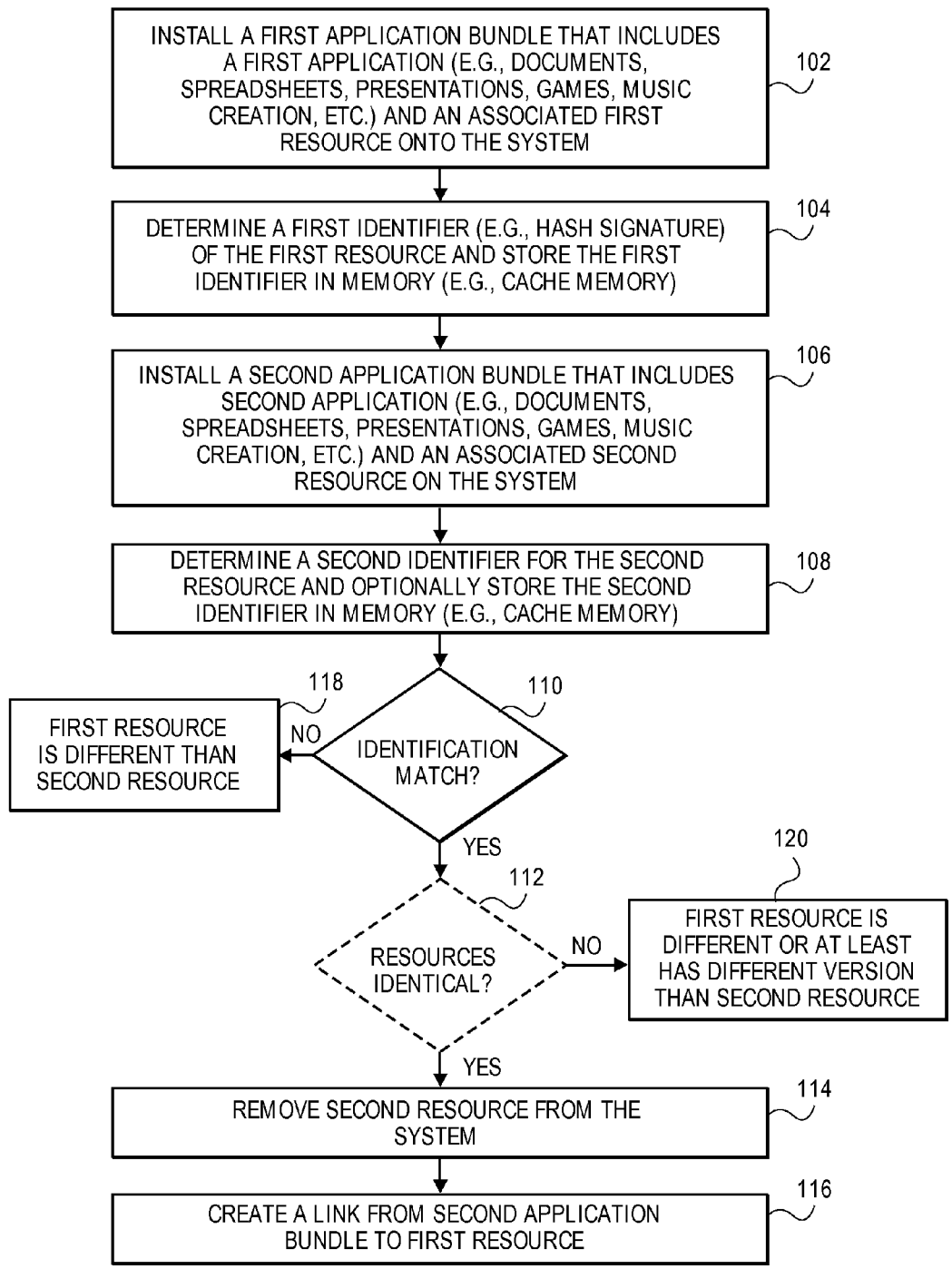
FIG. 1 illustrates a flow diagram in one embodiment of the present invention for a computer-implemented method 100 of sharing resource dependencies in a system.

FIG. 1 illustrates a flow diagram in one embodiment of the present invention for a computer-implemented method 100 of sharing resource dependencies in a system. The computer-implemented method 100 is performed by processing logic that may include hardware (circuitry, dedicated logic, etc.), software (such as is run on a general purpose computer system or a dedicated machine or a system), or a combination of both. The process logic may include an installer for performing the operations of the computer-implemented method 100.

In one embodiment, a system includes a storage unit (e.g., non-volatile storage, disk drive, flash memory, etc.). At block 102, the processing logic (e.g., installer) installs a first application bundle that includes one or more applications, respective resources (e.g., frameworks), other resources, etc. Resources may include frameworks, any directory of files, any file system sub-tree of files. Examples of types of shared resources include sets of audio loops, clip art photos, reference libraries (e.g., spelling check dictionary, etc.), etc. The first application bundle may include a first application (e.g., documents, spreadsheets, presentations, games, music creation, etc.) a first resource, other resources, etc. onto the system. A link (e.g., hard link, symbolic link or symlink or soft link) may exist between the first application and the associated or embedded first resource. A hard link is a directory entry that associates a name with a file on a file system. A directory is a special kind of file that contains a list of such entries. Hard links may not normally point to directories and may not link paths on different volumes or file systems. Symbolic links may point to any file or directory irrespective of the volumes on which the source and destination reside. The link is a feature of a file system that enables multiple links to be created for the same file while only having one copy of the file saved to the storage unit or other location. The first application and first resource may be stored in the storage unit. A link may exist between the first resource and memory (e.g., RAM, cache memory). At block 104, the processing logic determines a first identifier (e.g., hash signature) of the first resource and stores the first identifier in memory (e.g., cache memory). At block 106, the processing logic (e.g., installer) can install a second application bundle that includes one more applications, respective resources, other resources, etc. The second application bundle may include a second application (e.g., documents, spreadsheets, presentations, games, music creation, etc.) and an associated or embedded second resource on the system. The second application and second resource may be stored in the storage unit. At block 108, the processing logic of the system can determine a second identifier for the second resource and optionally store the second identifier in memory (e.g., cache memory). At block 110, the processing logic can determine whether the second identifier matches the first identifier by comparing the second identifier to the first identifier that is stored in memory. In one embodiment, the identifiers are hash signatures of a respective resource. At block 112, if the identifiers match, then the processing logic can optionally determine whether the first resource is identical to the second resource by comparing additional signature files (e.g., property list files) of the first resource with additional signature files (e.g., property list files) of the second resource. The signature files may include permission sets, pathnames, filenames, etc. The signature files may also be stored in the memory (e.g., cache memory). An installation package may include installer metadata (e.g, length of data contained in a file, timestamp, etc.), which may also be stored in the memory.

At block 114, if the first and second identifiers match, then processing logic can remove the second resource from the system. The second resource may be removed from the storage unit. Alternatively, the second resource can be removed at a later time (e.g., after block 116). If the first and second applications are launched, then the first and second applications and the first resource will be loaded into memory (e.g., RAM) of the system.

At block 116, if the first and second identifiers match, then the processing logic can create a link from the second application bundle to the first resource. Alternatively, if the first and second identifiers match and the signature files of the first and second resources are the same, then the processing logic can create a link from the second application bundle to the first resource. In one embodiment, a link is created from the second application bundle to the shared first resource, which is pointed to by the link to first application bundle and the link to memory. In this case, a reference count assigned by a reference counter in a file system is incremented for the first resource because of the new link to the second application bundle. The reference counter can count how many applications and what applications refer to and use a resource. If the first and second applications are launched, then the first and second applications and the first resource will be loaded into memory (e.g., RAM) of the system.

For a conventional approach, if the first and second applications are launched, then the first and second applications and first and second resources will be loaded into memory (e.g., RAM) of the system.

Returning to block 110, if the identifiers do not match, then the processing logic determines that the first resource is different than the second resource at block 118. Thus, the second application and second resource remain on the system. A link may exist between the second resource and memory (e.g., RAM, cache memory). In one embodiment, the first resource is a first framework that is associated with the first application and the second resource is a second framework that is associated with the second application.

Returning to block 112, if the resources are not identical, then the processing logic can determine that the resources are different or at least represent different versions of the same resource at block 120. Thus, the second application and second resource remain on the system. A link may exist between the second resource and memory (e.g., RAM, cache memory). In this manner, if a third resource is installed, then the method 100 can be applied such that a third identifier associated with the third resource is compared to the first and second identifiers. The third resource may not be stored on the system if the third identifier matches the first or second identifier.

Figure 2:
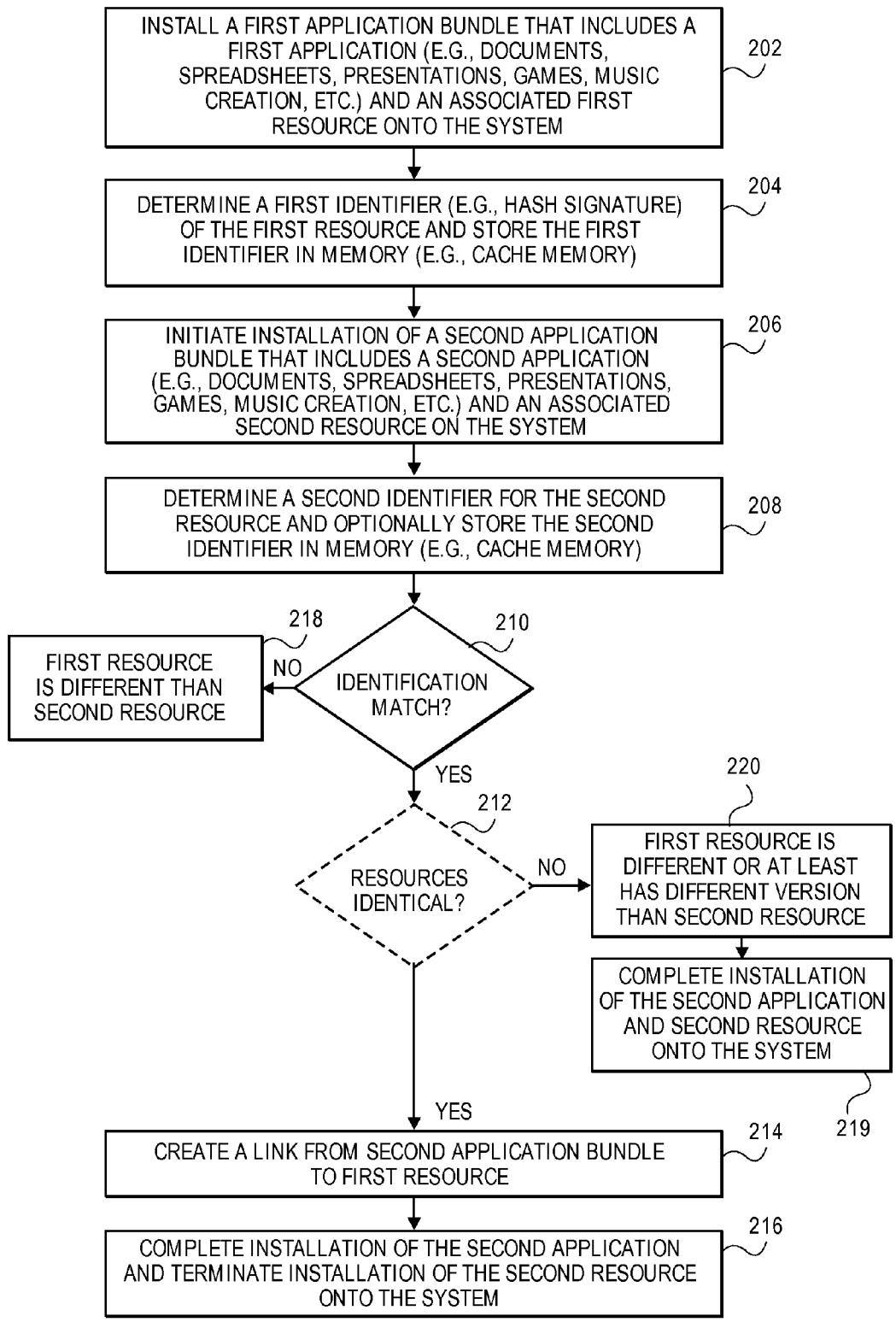
FIG. 2 illustrates a flow diagram in one embodiment of the present invention for a computer-implemented method 200 of sharing resource dependencies in a system.

FIG. 2 illustrates a flow diagram in one embodiment of the present invention for a computer-implemented method 200 of sharing resource dependencies in a system. The computer-implemented method 200 is performed by processing logic that may include hardware (circuitry, dedicated logic, etc.), software (such as is run on a general purpose computer system or a dedicated machine or a system), or a combination of both. The process logic may include an installer for performing the operations of the computer-implemented method 200.

In one embodiment, a system includes a storage unit (e.g., non-volatile storage, disk drive, flash memory, etc.). At block 202, the processing logic (e.g., installer) installs a first application bundle that includes one or more applications, respective resources, other resources, etc. Resources may include frameworks, any directory of files, any file system sub-tree of files, etc. The first application bundle may include a first application (e.g., documents, spreadsheets, presentations, games, music creation, etc.) a first resource, other resources, etc. onto the system. A link (e.g., hard link, symbolic link) may exist between the first application and the associated or embedded first resource. The link is a feature of a file system that enables multiple links to be created for the same file while only having one copy of the file saved to the storage unit or other location. The first application and first resource may be stored in the storage unit. A link may exist between the first resource and memory (e.g., RAM, cache memory). At block 204, the processing logic determines a first identifier (e.g., hash signature) of the first resource and stores the first identifier in memory (e.g., cache memory). At block 206, the processing logic (e.g., installer) can initiate installation of a second application bundle that includes one more applications, respective resources, other resources, etc. The second application bundle may include a second application (e.g., documents, spreadsheets, presentations, games, music creation, etc.) and an associated or embedded second resource on the system. The second application and second resource may not be stored in the storage unit at this time. At block 208, the processing logic of the system can determine a second identifier for the second resource and optionally store the second identifier in memory (e.g., cache memory). At block 210, the processing logic can determine whether the second identifier matches the first identifier by comparing the second identifier to the first identifier that is stored in memory (e.g., cache memory). In one embodiment, the identifiers are hash signatures of a respective resource (e.g., framework). At block 212, if the identifiers match, then the processing logic can optionally determine whether the first resource is identical to the second resource by comparing additional signature files (e.g., property list files) of the first resource with additional signature files (e.g., property list files) of the second resource. The signature files may include permission sets, pathnames, filenames, etc. The signature files may also be stored in the memory (e.g., cache memory). An installation package may include installer metadata (e.g, length of data contained in a file, timestamp, etc.), which may also be stored in the memory.

At block 214, if the first and second identifiers match, then the processing logic can create a link from the second application bundle to the first resource. Alternatively, if the first and second identifiers match and the signature files (e.g., property list files) of the first and second resources are the same, then the processing logic can create a link from the second application bundle to the first resource. In one embodiment, a link is created from the second application bundle to shared first resource, which is pointed to by the link to first application bundle and the link to memory. In this case, an initial or default reference count assigned by a reference counter of the file system is incremented for the first resource because of the new link to the second application bundle. At block 216, the processing logic completes installation of the second application and terminates installation of the second resource onto the system. If the first and second applications are launched, then the first and second applications and the first resource will be loaded into memory (e.g., RAM) of the system.

For a conventional approach, if the first and second applications are launched, then the first and second applications and first and second resources will be loaded into memory (e.g., RAM) of the system.

Returning to block 210, if the identifiers do not match, then the processing logic determines that the first resource is different than the second resource at block 218. In one embodiment, the first resource is a first framework that is associated with the first application and the second resource is a second framework that is associated with the second application. Thus, the processing logic completes installation of the second application and second resource onto the system at block 219. A link may exist between the second resource and memory (e.g., RAM, cache memory).

Returning to block 212, if the resources are not identical, then the processing logic can determine that the resources are different or at least represent different versions of the same resource at block 220. Thus, the processing logic completes installation of the second application and second resource onto the system at block 219. A link may exist between the second resource and memory (e.g., RAM, cache memory). In this manner, if installation for a third resource is initiated, then the method 200 can be applied such that a third identifier associated with the third resource is compared to the first and second identifiers. The installation of the third resource may not be completed if the third identifier matches the first or second identifier.

Figure 3:
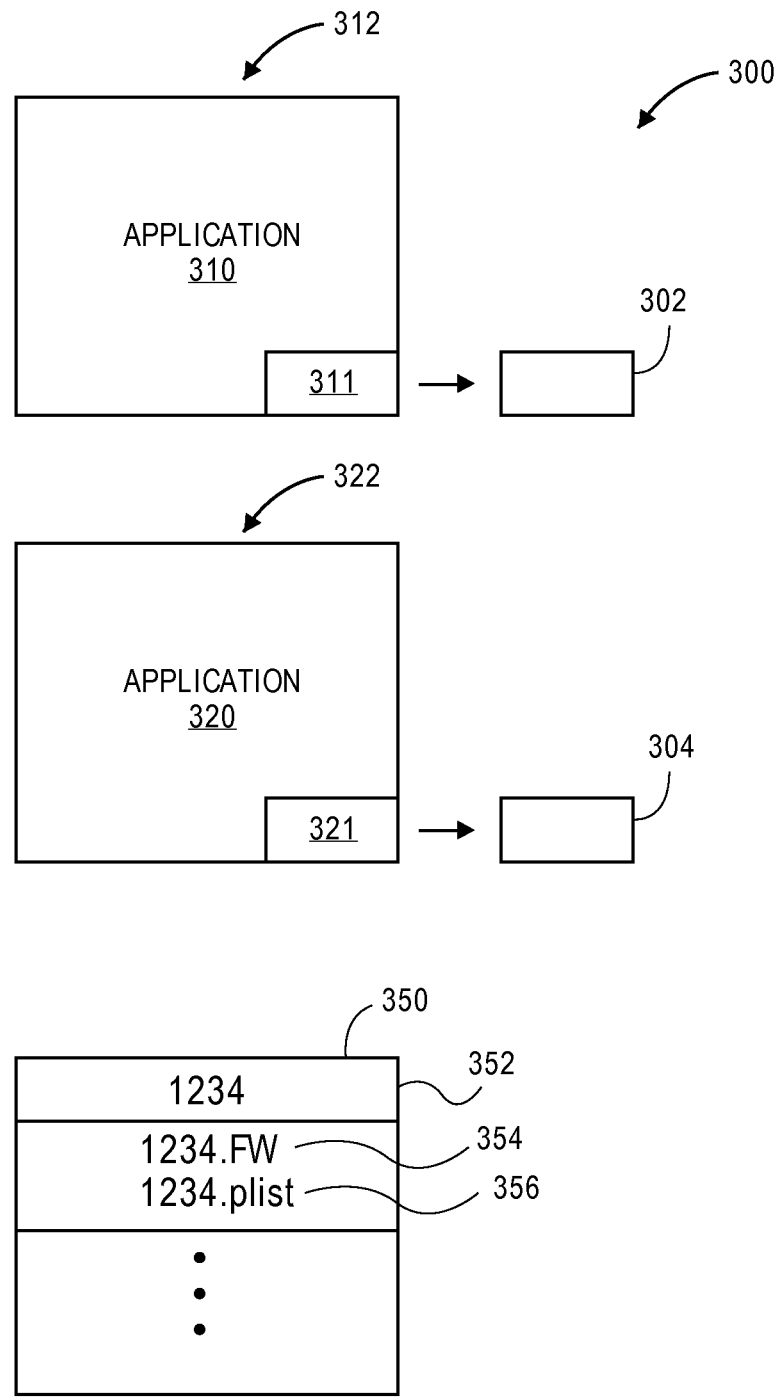
FIG. 3 illustrates an exemplary mapping between applications and respective embedded resources in memory in a system in one embodiment of the present invention.

FIG. 3 illustrates an exemplary mapping between applications and respective resources in memory in a system in one embodiment of the present invention. Application bundle 312 includes an application 310 and embedded resource 311 and application bundle 322 includes an application 320 and an embedded resource 321. The resource 311 points to block 302. Resource 321 points to block 304. The blocks 302 and 304 may be located in the storage unit of the system.

Memory 350 (e.g., cache memory, memory in the storage unit) includes installer metadata and identifiers of resources. In one embodiment, an identifier of resource 311 is saved in memory 350. The memory 350 includes a folder 352 that includes a resource identifier 354 (e.g., hash signature 1234.FW) and additional signature files (e.g., property list files) such as 1234.plist 356 for the resource (e.g., 1234.meta). In an embodiment, an installer can install the application 320 and resource 321 and then determine whether an identifier (e.g., hash signature) for the resource 321 matches the identifier 354. The installer can also determine whether the signature files (e.g., property list files) for resource 321 match signature files (e.g., property list files 356) for resource 311. If so, then the resource 311 is identical to the resource 321 with both resources have the same version. In this case, the installer can create a link from application bundle 322 (e.g., resource 321) to resource 311. The reference count for the resource 311 is incremented based on the link to application bundle 322. The installer also removes resource 321 if it has been installed in accordance with computer-implemented method 100 or terminates the installation of resource 321 if it has not been installed in accordance with computer-implemented method 200. In one embodiment, the resource 311 is a framework that is associated with the application 310 and the second resource is a framework that is associated with the application 320.

The matching of the identifiers may result in a false positive. For example, the hash signature of resource 311 may match the hash signature of resource 321. However, these resources may not actually be identical. In this case, the comparison of the signature files (e.g., property list files) can be used to determine that the resources 311 and 321 are actually different even though the hash signatures are the same. The signature files (e.g, property list files) can have file or path names that are different indicating that the resources are different.

Resource (e.g., framework) signature(s) (e.g., cryptographic hash function such as SHA-1 of data, names, permissions, etc) and sub-signatures (e.g., SHA-1 of data, name, permissions, etc) are stored in the memory (e.g., cache memory) to avoid the need to re-compute all of the shared frameworks signatures for every run of the cache tool. Alternatively, the data can be stored in cache memory and revalidated before creating a link. This implementation is more robust in case the framework is altered after the framework is added to the cache.

In an embodiment, if the one of the applications is deleted, then the reference count for resource 311 is decremented. The reference count for resource 311 may be one plus the number of installed applications using it. In this case, the resource 311 has a reference count of two based on the other application that refers to the resource 311 and a link to a copy of the resource 311 in cache. If both applications are deleted, then the reference count is decremented to one for the resource 311 and the cache's link. A cache tool may remove the final link (i.e., the link to the copy of the resource 311 in cache) causing this resource to be removed from the system.

Figure 4:
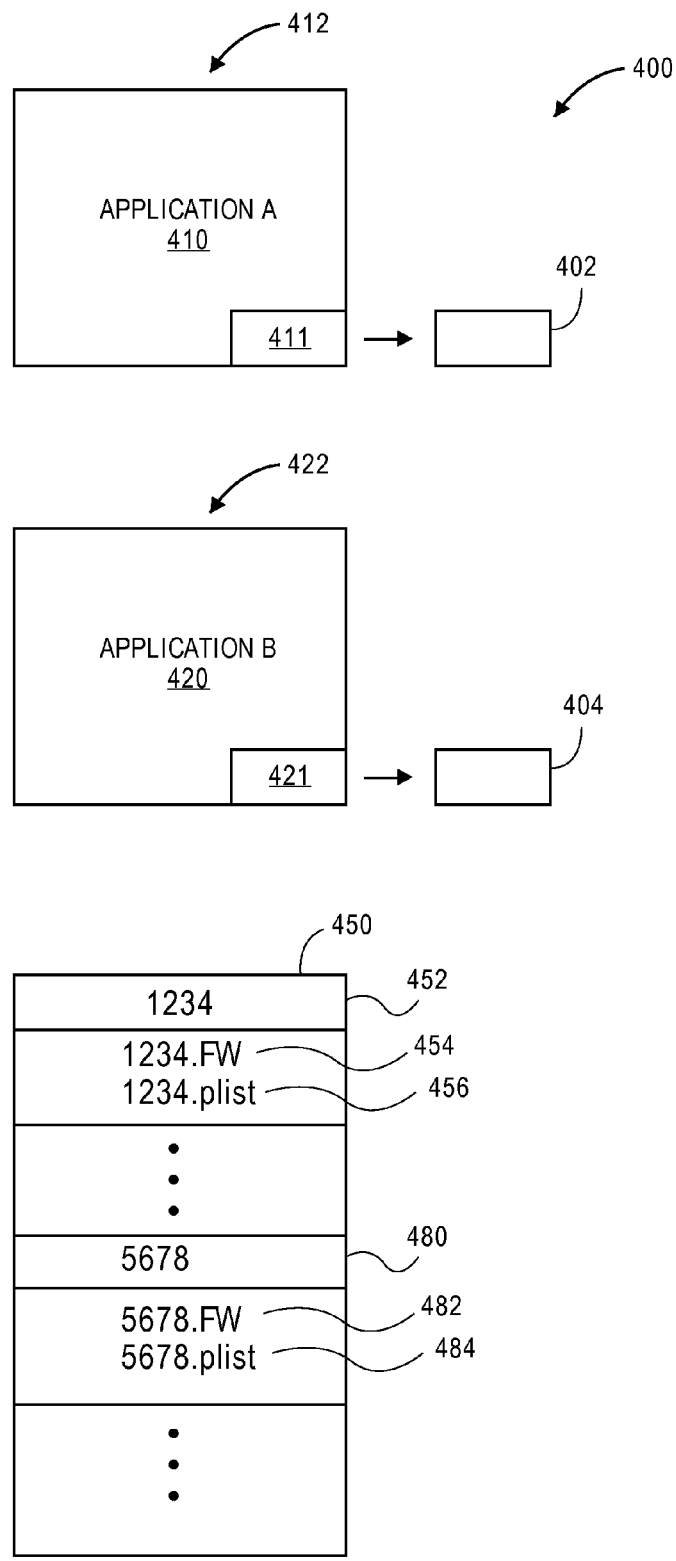
FIG. 4 illustrates an exemplary mapping between applications and respective embedded resources in memory in a system in one embodiment of the present invention.

FIG. 4 illustrates an exemplary mapping between applications and respective embedded resources in memory in a system in one embodiment of the present invention. Application bundle 412 includes an application 410 and an embedded resource 411 and application bundle 422 includes an application 420 and an embedded resource 421. The resource 411 points to block 402. Resource 404 points to block 404. The blocks 402 and 404 may be located in the storage unit of the system.

Memory 450 (e.g., cache memory, memory in the storage unit) includes installer metadata and identifiers of resources. In one embodiment, an identifier of resource 411 is saved in memory 450. The memory 450 includes a folder 452 that includes a resource identifier 454 (e.g., hash signature 1234.FW) and signature files (e.g., 1234.plist) 456 for the resource 411. The signature files (e.g., property list files) may store a user's settings, information about bundles and applications, filenames, filepaths, etc. The memory 450 also includes a folder 480 that includes a resource identifier 482 (e.g., hash signature 5678.FW) and signature files 484 (e.g., 5678.plist) for the resource 421.

In an embodiment, an installer can install the application 420 and resource 421 and then determine whether an identifier 454 (e.g., hash signature) for the resource 411 matches the identifier 482 for the resource 421. The installer can also determine whether metadata or signature files for resource 421 matches metadata or signature files for resource 411. If so, then the resource 411 is identical to the resource 421 with both resources having the same version. Alternatively, the identifiers 454 and 482 are different indicating that the resources are different or have different versions. The resources 411 and 421 will remain in the storage unit if previously installed or installation will complete.

Figure 5:
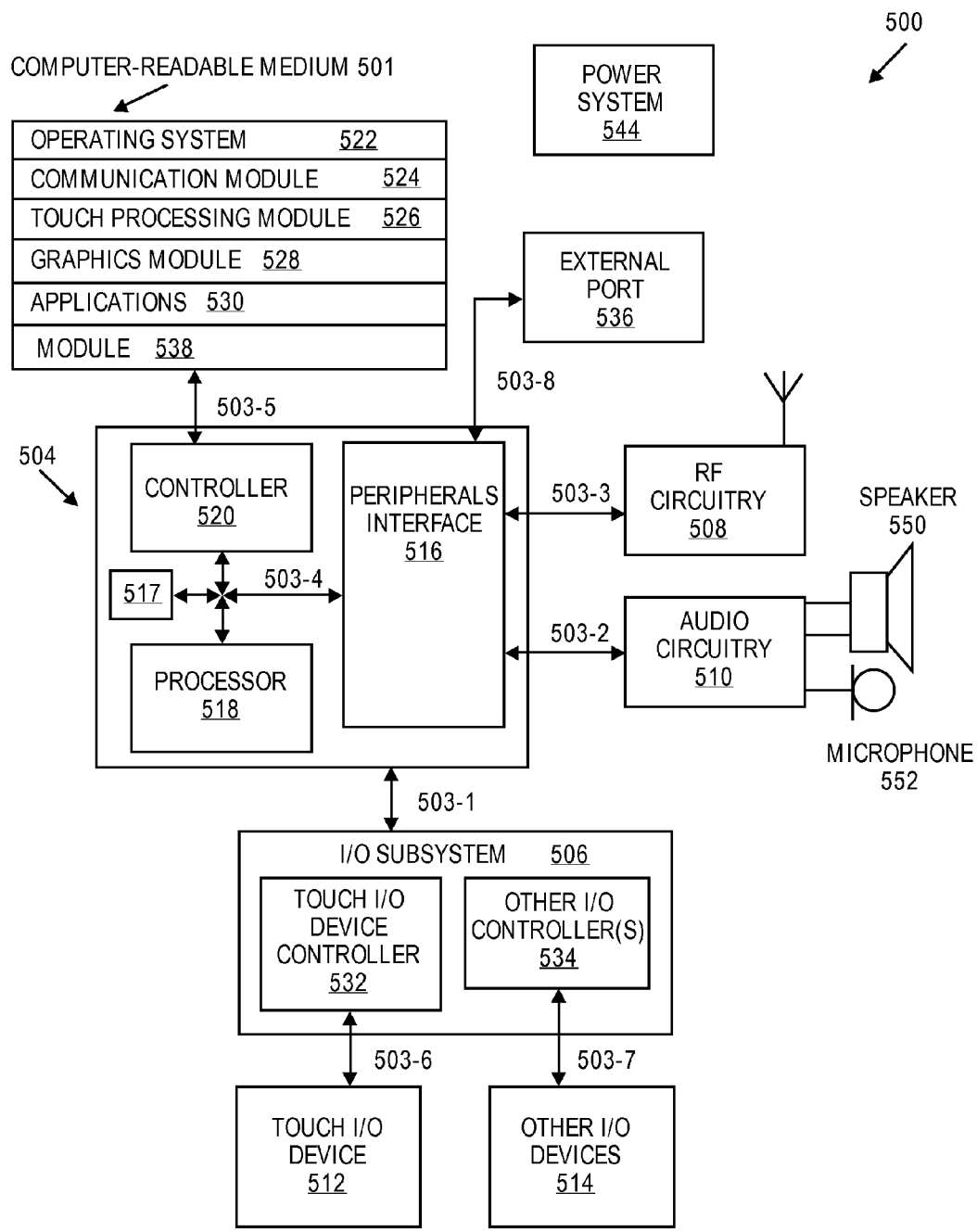
FIG. 5 shows in one embodiment of the present invention a wireless system which includes the capability for wireless communication.

Attention is now directed towards embodiments of a system architecture that may be embodied within any portable or non-portable device including but not limited to a communication device (e.g. mobile phone, smart phone), a multimedia device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 500, including combinations of two or more of these types of devices. FIG. 5 is a block diagram of one embodiment of system 500 that generally includes one or more computer-readable non-transitory storage mediums 501, processing system 504, Input/Output (I/O) subsystem 506, radio frequency (RF) circuitry 508 and audio circuitry 510. These components may be coupled by one or more communication buses or signal lines 503.

It should be apparent that the architecture shown in FIG. 5 is only one example architecture of system 500, and that system 500 could have more or fewer components than shown, or a different configuration of components. The various components shown in FIG. 5 can be implemented in hardware, software, firmware or any combination thereof, including one or more signal processing and/or application specific integrated circuits.

RF circuitry 508 is used to send and receive information over a wireless link or network to one or more other devices and includes well-known circuitry for performing this function. RF circuitry 508 and audio circuitry 510 are coupled to processing system 504 via peripherals interface 516. Interface 516 includes various known components for establishing and maintaining communication between peripherals and processing system 504. Audio circuitry 510 is coupled to audio speaker 950 and microphone 952 and includes known circuitry for processing voice signals received from interface 516 to enable a user to communicate in real-time with other users. In some embodiments, audio circuitry 510 includes a headphone jack (not shown).

Peripherals interface 516 couples the input and output peripherals of the system to processor 518 and computer-readable medium 501. One or more processors 518 communicate with one or more computer-readable mediums 501 via controller 520. Computer-readable medium 501 can be any device or medium (e.g., storage unit, storage device, non-transitory storage medium) that can store code and/or data for use by one or more processors 518. Medium 501 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 501 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 518 run various software components stored in medium 501 to perform various functions for system 500. In some embodiments, the software components include operating system 522, communication module (or set of instructions) 524, touch processing module (or set of instructions) 526, graphics module (or set of instructions) 528, one or more applications (or set of instructions) 530, and installer module [or set of instructions] 538. In an embodiment, an installer application is associated with a installer module 538. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments.

In some embodiments, medium 501 may store a subset of the modules and data structures identified above. Furthermore, medium 501 may store additional modules and data structures not described above.

Operating system 522 includes various procedures, sets of instructions, software components and/or drivers for controlling and managing general system tasks (e.g., memory management, storage device control, power management, etc.) and facilitates communication between various hardware and software components.

Communication module 524 facilitates communication with other devices over one or more external ports 536 or via RF circuitry 508 and includes various software components for handling data received from RF circuitry 508 and/or external port 536.

Graphics module 528 includes various known software components for rendering, animating and displaying graphical objects on a display surface. In embodiments in which touch I/O device 512 is a touch sensitive display (e.g., touch screen), graphics module 528 includes components for rendering, displaying, and animating objects on the touch sensitive display.

One or more applications 530 can include any applications installed on system 500, including without limitation, a collaborative application, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 526 includes various software components for performing various tasks associated with touch I/O device 512 including but not limited to receiving and processing touch input received from I/O device 512 via touch I/O device controller 932.

System 500 may further include installer module 538 (e.g., installer) for performing the method/functions as described herein in connection with FIGS. 1-4. In one embodiment, the installer module 538 may at least function to install applications bundles with applications and resources and share resource dependencies. For example, the installer module 538 may installing multiple applications and respective resources on the system. Next, the installer module 538 may determine identifiers (e.g., hash signatures) for first and second resources and may determine whether the resources are identical if an identifier for the first resource matches an identifier for the second resource. Then, a link (e.g., hard link, symbolic link) is created from the second application bundle to the first resource if the first resource is identical to the second resource. The second resource may be removed from the system if the second resource has been installed to the system. Alternatively, if the second resource has not been installed, then the installation is terminated.

In an embodiment, cache memory 517 stores one or more identifiers of the resources and signature files (e.g, property list files) for the resources. The cache memory 517 may be located in processing system 504 or anywhere in the system 500 such as within medium 901. The functions/features of the present disclosure may be implemented with the installer module 538 and cache memory 517 as part of a file system cache or file system compression. The installer module 538 may compare a signature file (e.g, property list file) for the first resource to a signature file (e.g, property list file) for the second resource in order to determine whether the resources are identical.

Module 538 may also interact with an installer application to provide the methods and functionality described herein. Module 538 may be embodied as hardware, software, firmware, or any combination thereof. Although module 538 is shown to reside within medium 501, all or portions of module 538 may be embodied within other components within system 500 or may be wholly embodied as a separate component within system 500.

In one embodiment, system 500 includes a storage unit 501 to store a first application and an associated first resource, a processing system 504 coupled to the storage unit 501, a cache memory 517 coupled to the processing system, and an installer module 538 with one or more programs. The one or more programs 538 are configured to be executed by the processing system. The programs include instructions to install a second application and an associated second resource on the storage unit 501, instructions to determine a second identifier for the second resource, instructions to determine whether the second identifier matches a first identifier of the first resource, and instructions to determine whether the first resource is identical to the second resource if the first identifier matches the second identifier.

The programs may further include instructions to create a link from the second application bundle to the first resource if the first resource is identical to the second resource and instructions to remove the second resource from the storage unit. The first identifier for the first resource may include a hash signature of the first resource and the second identifier for the second resource may include a hash signature of the second resource. The determining of whether the first resource is identical to the second resource if the first identifier matches the second identifier may be based on a comparison of signature files (e.g, property list files) of the first resource and signature files (e.g, property list files) of the second resource. The determining of whether the second identifier matches a first identifier of the first resource may include comparing the second identifier to the first identifier, which is stored in the cache memory 517. In one embodiment, the first resource includes a first framework or a first directory of files and the second resource includes a second framework or a second directory of files.

I/O subsystem 506 is coupled to touch I/O device 512 and one or more other I/O devices 914 for controlling or performing various functions. Touch I/O device 512 communicates with processing system 504 via touch I/O device controller 2032, which includes various components for processing user touch input (e.g., scanning hardware). One or more other input controllers 2034 receives/sends electrical signals from/to other I/O devices 914. Other I/O devices 914 may include physical buttons, dials, slider switches, sticks, keyboards, touch pads, additional display screens, or any combination thereof.

If embodied as a touch screen, touch I/O device 512 displays visual output to the user in a GUI. The visual output may include text, graphics, video, and any combination thereof. Some or all of the visual output may correspond to user-interface objects. Touch I/O device 512 forms a touch-sensitive surface that accepts touch input from the user. Touch I/O device 512 and touch screen controller 932 (along with any associated modules and/or sets of instructions in medium 501) detects and tracks touches or near touches (and any movement or release of the touch) on touch I/O device 512 and converts the detected touch input into interaction with graphical objects, such as one or more user-interface objects. In the case in which device 512 is embodied as a touch screen, the user can directly interact with graphical objects that are displayed on the touch screen. Alternatively, in the case in which device 512 is embodied as a touch device other than a touch screen (e.g., a touch pad), the user may indirectly interact with graphical objects that are displayed on a separate display screen embodied as I/O device 914.

Touch I/O device 512 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety.

Embodiments in which touch I/O device 512 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 512 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 500 also includes power system 544 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 516, one or more processors 518, and memory controller 520 may be implemented on a single chip, such as processing system 504. In some other embodiments, they may be implemented on separate chips.

In certain embodiments of the present disclosure, the system 500 can be used to implement at least some of the methods discussed in the present disclosure.

Some portions of the detailed descriptions are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The present disclosure can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable non-transitory storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

A machine-readable medium includes any mechanism for storing or transmitting information in a form readable by a machine (e.g., a computer). For example, machines store and communicate (internally and with other devices over a network) code and data using machine-readable media, such as machine storage media (e.g., magnetic disks; optical disks; random access memory; read only memory; flash memory devices; phase-change memory).

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program (e.g., game center application) to use the services provided by a Software Development Kit (SDK) library. In other embodiments an application or other client program may use an API provided by an Application Resource. In these embodiments the application or client program may incorporate calls to functions or methods provided by the SDK and provided by the API or use data types or objects defined in the SDK and provided by the API. An Application Resource may in these embodiments provide a main event loop for a program that responds to various events defined by the Resource. The API allows the application to specify the events and the responses to the events using the Application Resource. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 6:
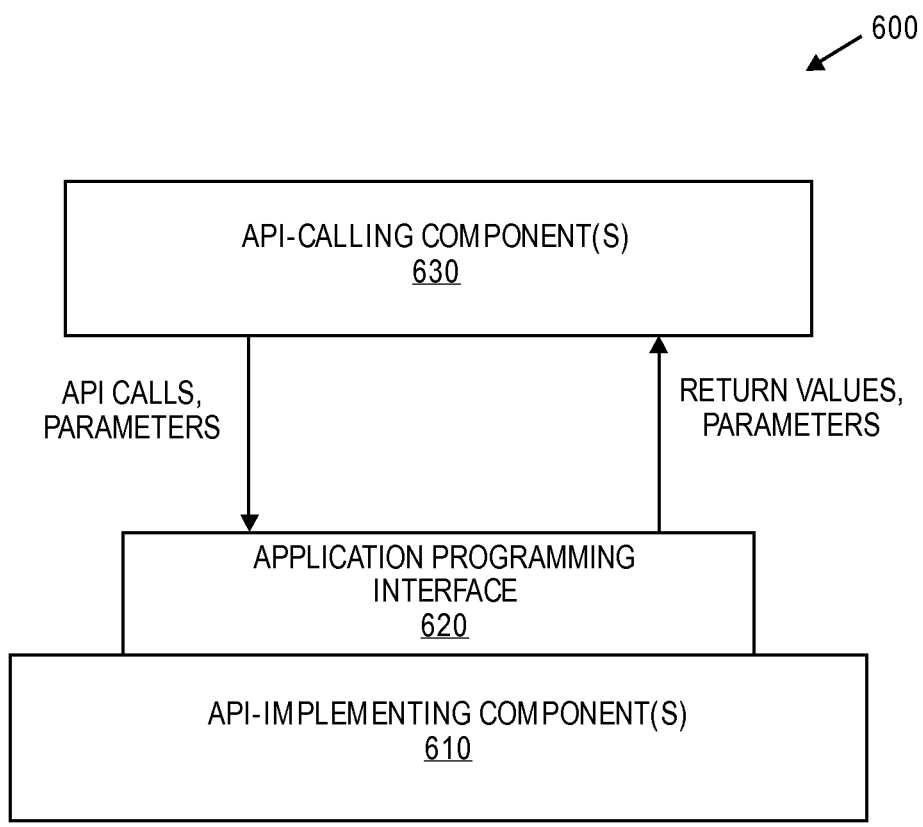
FIG. 6 is a block diagram illustrating an exemplary API architecture, which may be used in one embodiment of the present invention; and In FIG. 7 ("Software Stack"), in one embodiment of the present invention, applications can make calls to Services A or B using several Service APIs and to Operating System (OS) using several OS APIs.

FIG. 6 is a block diagram illustrating an exemplary API architecture, which may be used in certain embodiments of the present disclosure. As shown in FIG. 6, the API architecture 600 includes the API-implementing component 610 (e.g., an operating system, a library, a device driver, an API, an application program, software or other module) that implements the API 620. The API 620 specifies one or more functions, methods, classes, objects, protocols, data structures, formats and/or other features of the API-implementing component that may be used by the API-calling component 630. The API 620 can specify at least one calling convention that specifies how a function in the API-implementing component receives parameters from the API-calling component and how the function returns a result to the API-calling component. The API-calling component 630 (e.g., an operating system, a library, a device driver, an API, an application program, software or other module) makes API calls through the API 620 to access and use the features of the API-implementing component 610 that are specified by the API 620. The API-implementing component 610 may return a value through the API 620 to the API-calling component 630 in response to an API call.

It will be appreciated that the API-implementing component 610 may include additional functions, methods, classes, data structures, and/or other features that are not specified through the API 620 and are not available to the API-calling component 630. It should be understood that the API-calling component 630 may be on the same system as the API-implementing component 610 or may be located remotely and accesses the API-implementing component 610 using the API 620 over a network. While FIG. 6 illustrates a single API-calling component 630 interacting with the API 620, it should be understood that other API-calling components, which may be written in different languages (or the same language) than the API-calling component 630, may use the API 620.

The API-implementing component 610, the API 3220, and the API-calling component 630 may be stored in a machine-readable medium (e.g., computer-readable medium), which includes any mechanism for storing information in a form readable by a machine (e.g., a computer or other data processing system). For example, a machine-readable medium includes magnetic disks, optical disks, random access memory; read only memory, flash memory devices, etc.

Figure 7:
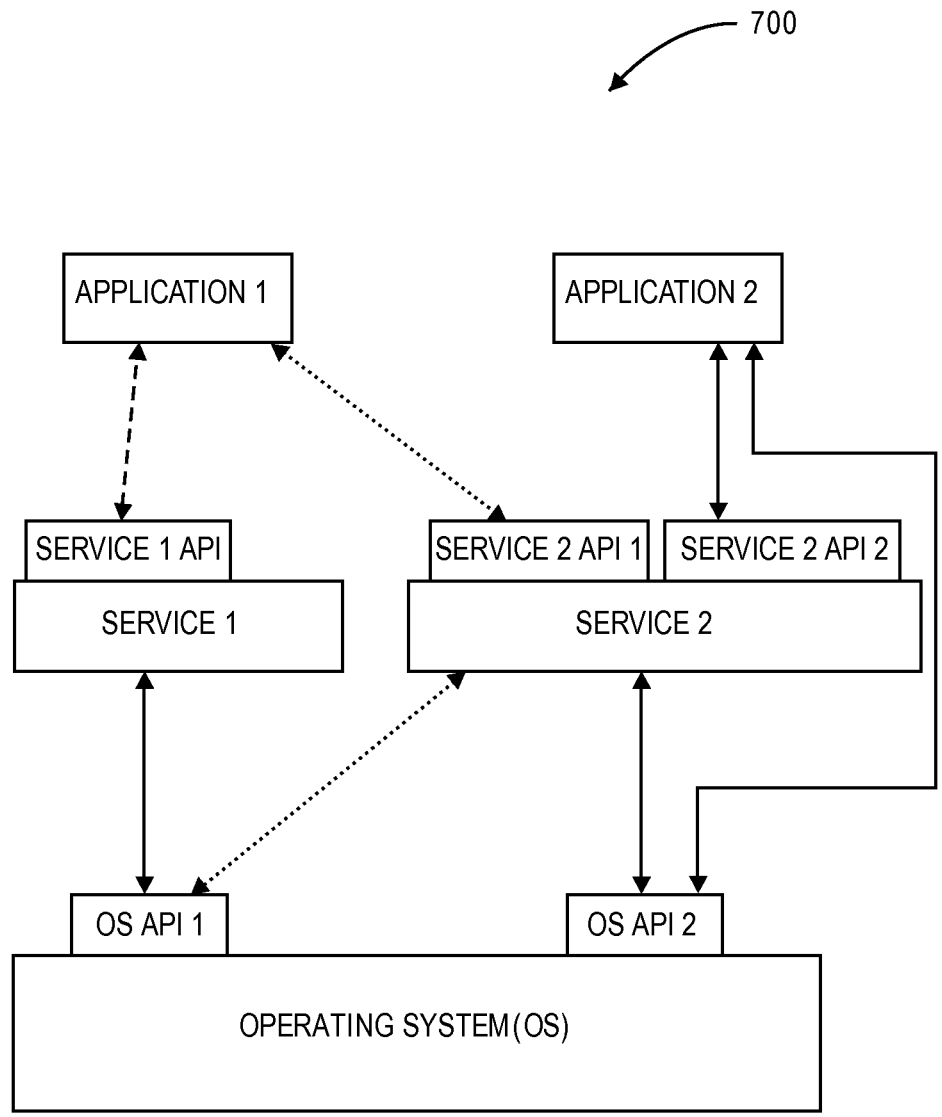

In FIG. 7 ("Software Stack"), in one embodiment of the present invention, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

In the foregoing specification, the disclosure has been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for sharing resource dependencies on a data processing system, comprising:

installing a second application bundle including a second application and an embedded second resource on the data processing system, wherein the data processing system includes a first application bundle including a first application and an associated first resource;

determining a second identifier for the second resource;

determining whether the second identifier including a signature file matches a first identifier including a signature file of the first resource;

determining whether the first resource is identical to the second resource if the first identifier matches the second identifier, wherein determining whether the first resource is identical to the second resource if the first identifier matches the second identifier is based on a comparison of additional signature files of the first resource and additional signature files of the second resource; and removing the second resource from the data processing system if the first resource is identical to the second resource.

2. The computer-implemented method of claim 1, further comprising:

creating a link from the second application bundle to the first resource if the first resource is identical to the second resource.

3. The computer-implemented method of claim 1, wherein determining whether the first resource is identical to the second resource if the first identifier matches the second identifier is based on a comparison of additional signature files including at least one of permission sets, pathnames, and filenames of the first resource and additional signature files including at least one of permission sets, pathnames, and filenames of the second resource.

4. The computer-implemented method of claim 3, wherein determining whether the first resource is identical to the second resource if the first identifier matches the second identifier is based on a comparison of additional signature files including property list files of the first resource and additional signature files including property list files of the second resource.

5. The computer-implemented method of claim 1, wherein determining whether the second identifier matches a first identifier of the first resource comprises comparing the second identifier to the first identifier, which is stored in cache memory.

6. A non-transitory computer readable medium containing executable computer program instructions which when executed by a computing system cause said system to perform a method, the method comprising:

installing a second application bundle including a second application and an embedded second resource on the data processing system, wherein the data processing system includes a first application bundle including a first application and an embedded first resource;

determining a second identifier for the second resource;

determining whether the second identifier including a signature file matches a first identifier including a signature file of the first resource;

determining whether the first resource is identical to the second resource if the first identifier matches the second identifier, wherein determining whether the first resource is identical to the second resource if the first identifier matches the second identifier is based on a comparison of additional signature files of the first resource and additional signature files of the second resource; and removing the second resource from the data processing system if the first resource is identical to the second resource.

7. The non-transitory computer readable medium of claim 6, further comprising:

creating a link from the second application bundle to the first resource if the first resource is identical to the second resource.

8. The non-transitory computer readable medium of claim 6, wherein determining whether the first resource is identical to the second resource if the first identifier matches the second identifier is based on a comparison of additional signature files including at least one of permission sets, pathnames, and filenames of the first resource and additional signature files including at least one of permission sets, pathnames, and filenames of the second resource.

9. The non-transitory computer readable medium of claim 8, wherein determining whether the first resource is identical to the second resource if the first identifier matches the second identifier is based on a comparison of additional signature files of the first resource and additional signature files of the second resource.

10. The non-transitory computer readable medium of claim 6, wherein determining whether the second identifier matches a first identifier of the first resource comprises comparing the second identifier to the first identifier, which is stored in cache memory.

11. A data processing system, comprising:

a non-transitory storage unit to store a first application bundle including a first application and an associated first resource;

a processing system coupled to the non-transitory storage unit;

a cache memory coupled to the processing system; and one or more programs, wherein the one or more programs are configured to be executed by the processing system, the programs including:

instructions to install a second application bundle including a second application and an associated second resource on the storage unit;

instructions to determine a second identifier for the second resource;

instructions to determine whether the second identifier matches a first identifier of the first resource;

instructions to determine whether the second identifier including a signature file matches a first identifier including a signature file of the first resource;

instructions to determine whether the first resource is identical to the second resource if the first identifier matches the second identifier, wherein determining whether the first resource is identical to the second resource if the first identifier matches the second identifier is based on a comparison of additional signature files of the first resource and additional signature files of the second resource; and instructions to remove the second resource from the storage unit if the first resource is identical to the second resource.

12. The system of claim 11, wherein the one or more programs are configured to be executed by the processing system, the programs further including:

instructions to create a link from the second application bundle to the first resource if the first resource is identical to the second resource.

13. The system of claim 11, wherein determining whether the first resource is identical to the second resource if the first identifier matches the second identifier is based on a comparison of additional signature files including at least one of permission sets, pathnames, and filenames of the first resource and additional signature files including at least one of permission sets, pathnames, and filenames of the second resource.

14. The system of claim 13, wherein determining whether the first resource is identical to the second resource if the first identifier matches the second identifier is based on a comparison of additional signature files of the first resource and additional signature files of the second resource.

15. The system of claim 11 wherein the first resource comprises a first framework or a first directory of files and the second resource comprises a second framework or a second directory of files.

16. A computer-implemented method for shared framework dependencies on a data processing system, comprising:
   initiating installation of a second application and an associated second framework on the data processing system, wherein the data processing system includes a first application and an associated first framework;
   determining a second identifier for the second framework;
   determining whether the second identifier including a signature file for the second framework matches a first identifier including a signature file of the first framework; and
   determining whether the first framework is identical to the second framework if the first identifier matches the second identifier, wherein determining whether the first framework is identical to the second framework if the first identifier matches the second identifier is based on a comparison of additional signature files of the first framework and additional signature files of the second framework, wherein the first framework provides support for a plurality of different applications.

17. The computer-implemented method of claim 16, the method further comprising:
   creating a link from the second application to the first framework if the first framework is identical to the second framework; and
   terminating the installation of the second framework onto the system.

18. The computer-implemented method of claim 16, wherein determining whether the first framework is identical to the second framework if the first identifier matches the second identifier is based on a comparison of additional signature files including at least one of permission sets, pathnames, and filenames of the first framework and additional signature files including at least one of permission sets, pathnames, and filenames of the second framework.

19. The computer-implemented method of claim 18, wherein determining whether the first framework is identical to the second framework if the first identifier matches the second identifier is based on a comparison of property list files of the first framework and property list files of the second framework.

20. The computer-implemented method of claim 16, the method further comprises completing the installation of the second framework on the system if the first framework is identical to the second framework.

21. A non-transitory computer readable medium containing executable computer program instructions which when executed by a computing system cause said system to perform a method, the method comprising:
   initiating installation of a second application and an associated second framework on the data processing system, wherein the data processing system includes a first application and an associated first framework;
   determining a second identifier for the second framework;
   determining whether the second identifier including a signature file for the second framework matches a first identifier including a signature file of the first framework; and
   determining whether the first framework is identical to the second framework if the first identifier matches the second identifier, wherein determining whether the first framework is identical to the second framework if the first identifier matches the second identifier is based on a comparison of additional signature files of the first framework and additional signature files of the second framework, wherein the first framework provides support for a plurality of different applications.

22. The non-transitory computer readable medium of claim 21, the method further comprising:
   creating a link from the second application to the first framework if the first framework is identical to the second framework; and
   terminating the installation of the second framework onto the system.

23. The non-transitory computer readable medium of claim 21, wherein determining whether the first framework is identical to the second framework if the first identifier matches the second identifier is based on a comparison of at least one additional signature file including at least one of permission sets, pathnames, and filenames of the first framework and at least one additional signature file including at least one of permission sets, pathnames, and filenames of the second framework.

24. The non-transitory computer readable medium of claim 23, wherein determining whether the first framework is identical to the second framework if the first identifier matches the second identifier is based on a comparison of property list files of the first framework and property list files of the second framework.

25. The non-transitory computer readable medium of claim 21, the method further comprises completing the installation of the second framework on the system if the first framework is identical to the second framework.

* * * * *